P. DICKSON.
Millstone Dress.
No. 11,665.
Patented June 12, 1854.
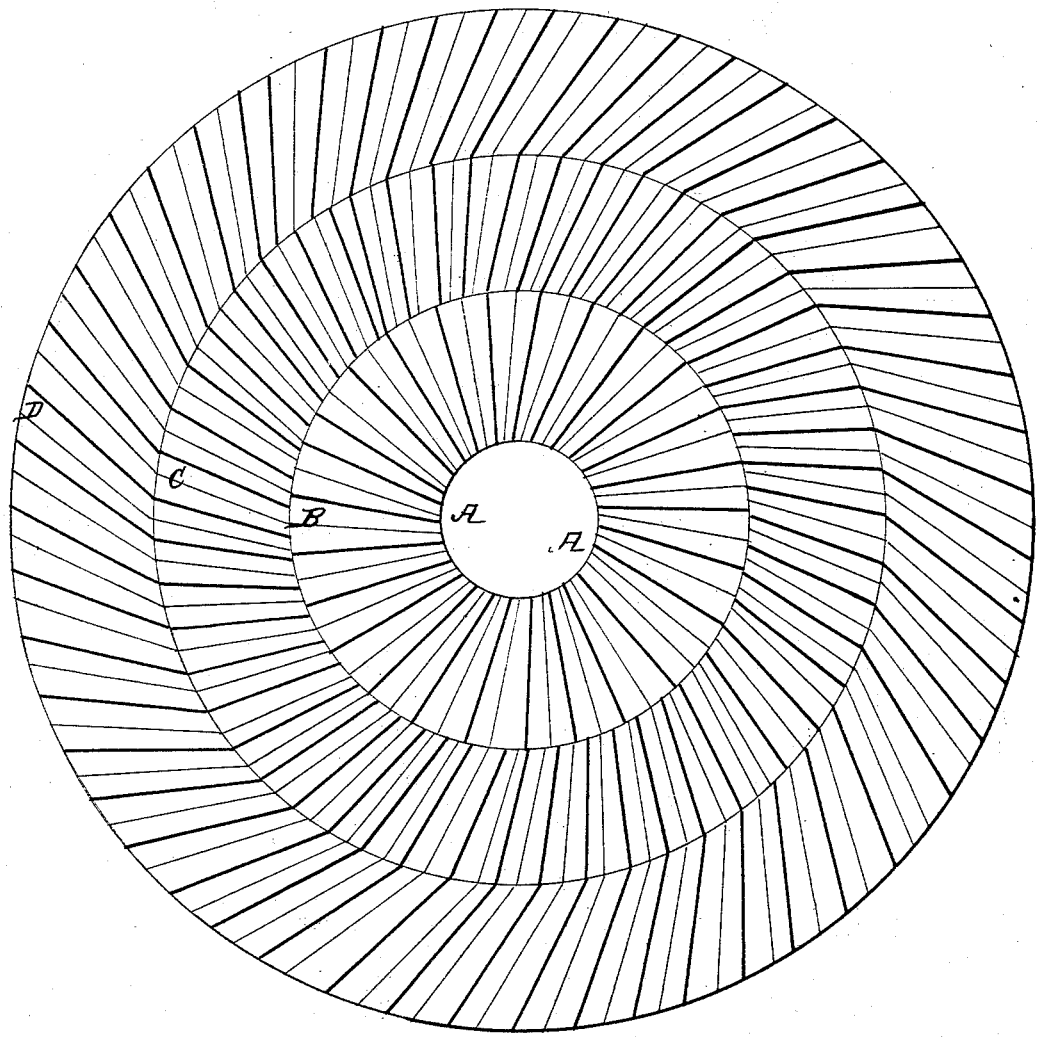

UNITED STATES PATENT OFFICE.

PERRY DICKSON, OF WOODCOCK TOWNSHIP, CRAWFORD COUNTY, PENNSYLVANIA.

MILLSTONE-DRESS.

Specification of Letters Patent No. 11,665, dated September 12, 1854.

*To all whom it may concern:*

Be it known that I, PERRY DICKSON, of Woodcock township, county of Crawford, and State of Pennsylvania, have invented a new and Improved Mode of Dressing Millstones for Grinding Grain; and I do hereby declare that the following is a full and exact description thereof, reference being had to the accompanying drawings and to letters of reference marked thereon.

The nature of my invention consists in the following to wit. I reduce the diameter of the grinding surface of millstones and thereby avoiding the necessity of having a great draft of the furrows, by which means, I secure a more certain action of the furrows. The furrows of millstones should operate similar to the blades of a pair of shears, in order to grind the grain well; but in order to grind cool (*i. e.* not heat and thereby spoil the flour). With the ordinary large size millstones the furrows are drafted so much that the furrows of the bed stone and the runner cross each other nearly at right angles (as is shown by the two circular cards A which represent two of the usual modes of furrowing millstones). This is not shown in the drawing, but in the disk to better show the difference in my manner of dressing, and the ordinary mode. And as shears will not cut when the blades are at right angles for the same reason, the furrows of millstones will not.

My improvement consists then in so dressing millstones that the furrows of the runner shall pass the furrows of the bed stone as nearly parallel as possible, and yet preserve a shear motion; which can only be done by having the grinding surface of the stones reduced.

My mode of dressing is as follows: reference being had to the drawings. A, A, is the eye of the millstone. I now divide the surface of the stone into three circles or courses as shown by the lines B, C, D. The part of the surface between the lines C, D, that is the third course of furrows is dressed down below the level of the first and second courses A, B, and B, C, as the outside course of furrows is not intended to grind, but merely to operate as conveyers to deliver the ground meal from under the stones. The three courses A B, B C, and C D, are laid off in any number of furrows to suit the texture of the stone. In the first course A, B, I lay off my furrows from the eye A A to the line B of any draft desired making all the furrows in the first course alike and of the same draft. In the second course C, B, I lay off twice the number of furrows that there is in the first course, and every other one of the furrows in the second course C B would come opposite to the end of a land in the first course A, B. I give the furrows in the second course more draft than the furrows in the first course. I lay out the same number of furrows in the third course that there is in the second course; that is, the furrows in the third course, are but a continuation of the furrows in the second course, only giving them more draft in the third course, as they are not intended to grind any, being dressed down lower than the other two courses, and are used only as conveyers to discharge the flour freely after it has been sufficiently ground by the other two courses. The runner and bed stone are both dressed alike, except that in the runner, the first course of furrows A, B, are not so long as the corresponding furrows in the bed stone; in order that the flour may discharge more freely from one course into the other.

What I claim as my invention and desire to secure by Letters Patent of the United States, is—

The dividing the face of the runner and bed stone into three circular courses of furrows A B, B C, and C D, all the furrows in A B, having the same draft; and having twice the number of furrows in B C, that there is in A B, and giving these furrows the same draft in respect to themselves, but a different draft from the furrows in A B, in combination with the furrows in the third course C, D, to operate as conveyers in the manner described, or any other construction substantially the same.

PERRY DICKSON.

Witnesses:
A. B. RICHMOND,
SAMUEL COLE, Jr.